United States Patent
Takagi

[11] Patent Number: 6,052,116
[45] Date of Patent: Apr. 18, 2000

[54] WIRELESS KEYBOARD SYSTEM

[75] Inventor: Yasushi Takagi, Tokyo, Japan

[73] Assignee: Oki Electric Industry Co., Ltd., Tokyo, Japan

[21] Appl. No.: 08/927,316

[22] Filed: Sep. 11, 1997

[30] Foreign Application Priority Data

Sep. 12, 1996 [JP] Japan ................................. 8-242258

[51] Int. Cl.[7] ...................................................... G09G 5/00
[52] U.S. Cl. ........................... 345/169; 345/169; 345/158
[58] Field of Search .................................. 345/168, 169, 345/172, 156, 158; 341/21, 22, 26, 173

[56] References Cited

U.S. PATENT DOCUMENTS 5,307,297  4/1994  Iguchi et al. ............................. 345/169
5,859,599  1/1999  Shiga ...................................... 345/168

*Primary Examiner*—Dennis-Doon Chow
*Attorney, Agent, or Firm*—Rabin & Champagne, P.C.

[57] ABSTRACT

A wireless keyboard system includes a wireless keyboard and a receiver unit. The wireless keyboard includes a controller and a transmitter. The controller detects the status of a standard key and nontext keys and generates a status information representing whether the nontext key is pressed or released and a key data representing which standard key is pressed and which nontext key is pressed. The transmitter transmits the key data together with the status information. The receiver unit generates a key code on the basis of the key data with reference to the status information.

20 Claims, 10 Drawing Sheets

WIRELESS KEYBOARD SYSTEM

CROSS REFERENCE TO RELATED APPLICATION

This application claims the priority of Application Ser. No. H08-242258, filed Sep. 12, 1996 in Japan, the subject matter of which is incorporated herein by reference.

TECHNICAL FIELD OF THE INVENTION

The present invention relates to a wireless keyboard system, including a wireless keyboard which transmits key data, representing which key is pressed, and a receiver unit which generates a key code to be processed by an upper device.

BACKGROUND OF THE INVENTION

A keyboard is the part of a computer system that enables the user to control certain aspects of the computer. In general, a keyboard includes a standard set of printable characters, usually laid out in the QWERTY pattern, function keys F1, F2 . . . , and a number of nontext keys, such as Control, Alt, and Shift. The nontext keys are used to change the meaning of another key. The standard set of printable characters are hereinafter called "standard key". Each of the standard keys functions itself, namely, each means something itself. On the other hand, the nontext keys are always used together with some of the standard keys, because the nontext keys do not mean anything themselves. In the keyboard, a number of key switches corresponding to the keys are arranged in matrix on the intersections of drive lines and receive lines. The keyboard is provided with a micro-controller which performs predetermined processing in response to key press and key release operations.

In a wireless keyboard, a micro-controller scans the key matrix to detect which keys are pressed, and transmits key data corresponding to the pressed keys via infrared or radio waves. For interlock function of keys, N-key-roll-over technique is generally used. In this technique, pressed keys are scanned in order, and are transmitted to an upper device, such as a personal computer. For instance, keys "a," "b" and "c" are pressed successively, the corresponding key data are transmitted in order. In the same manner, for the nontext keys, such as SHIFT and CTRL, the corresponding key data are transmitted to the upper device. For example, when SHIFT(L) key and "a" key are pressed at the same time, the key data of SHIFT(L) are first transmitted and the key data of "a" follows. Ii response to the two pieces of key data, the upper device recognize character "A" (=SHIFT(L)+"a").

In accordance with N-key-roll-over technique, the key codes are transmitted in the order of key scan, regardless of the function of the keys. With a wired keyboard, no transmission error occurs.

With the wireless keyboard, however, transmission errors may occur due to outside noise, interference, directivity of infrared, and the like. For instance, in the case where the key data of "a" is not transmitted to the upper device, although a combination of SHIFT and "a" have been pressed at the same time, the upper device can not recognize anything. That is because the nontext key SHIFT does not mean anything itself. The upper device, however, can finally recognize the demanded key data "A" when key press of "a" is repeated. On the other hand, if the key data of SHFT are not transmitted to the upper device, the upper device recognize the key data of "a" without any doubt. That is the problem.

OBJECTS OF THE INVENTION

Accordingly, an object of the invention is to provide a reliable wireless keyboard system in which error transmission can be prevented.

Another object of the invention is to provide a method for transmitting key data, in which error transmission can be prevented.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the invention, a wireless keyboard system includes a wireless keyboard and a receiver unit. The wireless keyboard includes standard keys, each of which functions itself and nontext keys which only function together with a simultaneously-pressed standard key. The wireless keyboard further includes a controller and a transmitter. The controller detects a status of the standard key and the nontext key and generates a status information representing whether the nontext key is pressed or released and a key data representing which standard key is pressed and which nontext key is pressed. The transmitter transmits the key data together with the status information. The receiver unit receives the key data transmitted together with the status information from the wireless keyboard and generates a key code on the basis of the key data with reference to the status information.

According to a second aspect of the invention, an improved wireless keyboard is provided. The wireless keyboard generates key data, representing which key is pressed, in response to keystrokes. The wireless keyboard includes standard keys, each of which functions itself and nontext keys only finctioning together with a simultaneously-pressed standard key. The wireless keyboard further includes a controller and a transmitter. The controller detects a status of the standard key and the nontext key and generates a status information representing whether the nontext key is pressed or released and a key data representing which standard key is pressed and which nontext key is pressed. The transmitter transmits status information of the nontext key, representing whether the nontext key is pressed or released.

According to a third aspect of the invention, an improved receiver unit is provided. The receiver unit receives key data transmitted together with a status information from a wireless keyboard and generates a key code on the basis of the key data transmitted from the wireless keyboard with reference to the status information. The wireless keyboard transmits the status information of nontext keys, which represents whether the nontext key is pressed or released, the nontext key only functioning together with a simultaneously-pressed standard key. The receiver unit includes a memory which stores the status information transmitted from the wireless keyboard. The status information, stored in the memory, is updated when the status information is different from the status information transmitted from the wireless keyboard.

According to a fourth aspect of the invention, an improved method for processing key data is provided. The key data is transmitted from a wireless keyboard to a receiver unit. The wireless keyboard includes standard keys each functioning itself and nontext keys functioning together with a simultaneously-pressed standard key. The method includes the steps of: detecting a status of the nontext key to generate a status information representing whether the nontext key is pressed or released; and generating a key data representing which standard key is pressed and which nontext key is pressed. The method further includes the steps of: transmitting from the wireless keyboard the key data together with the status information to the receiver unit; and generating in the receiver unit a key code on the basis of the key data with reference to the status information.

DETAILED DISCLOSURE OF THE INVENTION

Figure 1:
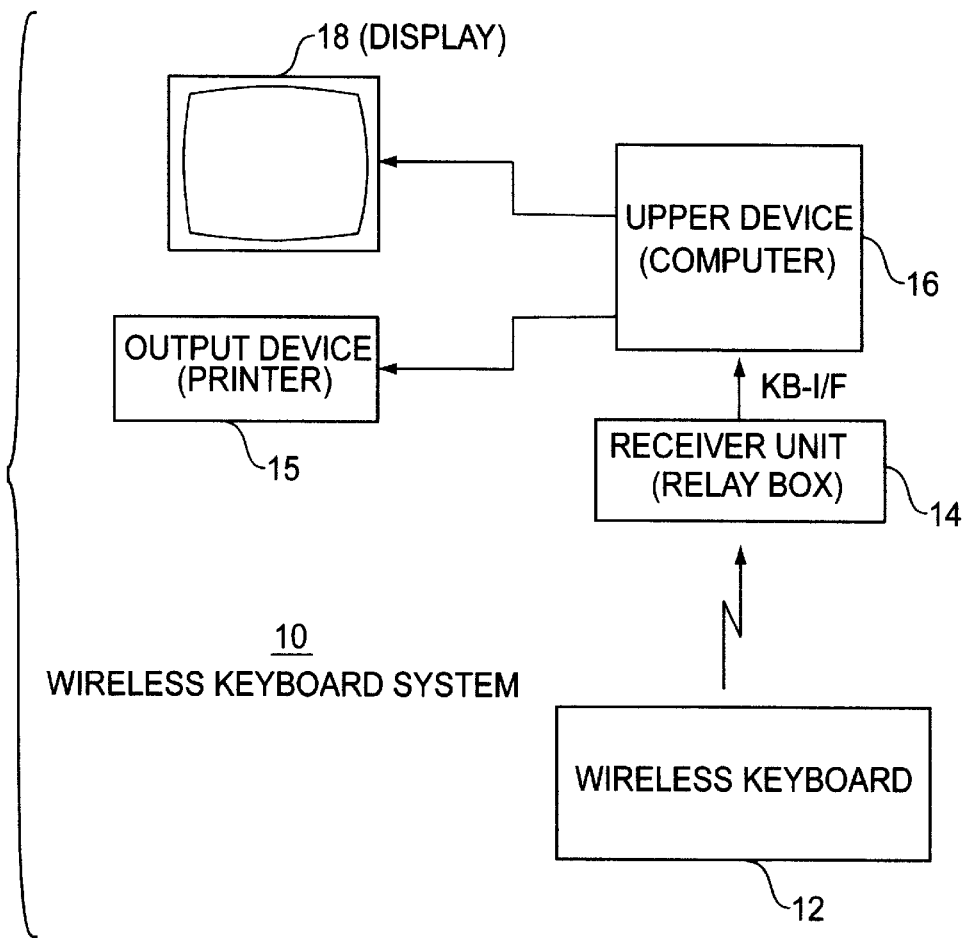
FIG. 1 is a block diagram showing a wireless keyboard system according to a first preferred embodiment of the invention.

FIG. 1 shows a wireless keyboard system 10, according to a first preferred embodiment of the invention. The wireless keyboard system 10 includes a wireless keyboard 12, and a receiver unit 14, which receives data transmitted from the wireless keyboard 12. The wireless keyboard 12 includes a standard set of printable characters, usually laid out in the QWERTY pattern, function keys F1, F2 . . . , and a number of nontext keys, such as Control, Alt, and Shift. The nontext keys are used to change the meaning of another key. The standard set of printable characters is hereinafter called "standard key." Each of the standard keys functions itself, namely, each standard key means something itself. On the other hand, the nontext keys are used only together with some of the standard keys, because the nontext keys do not mean anything themselves. In the keyboard, a number of key switches corresponding to the keys are arranged in matrix on the intersections of drive lines and receive lines.

The receiver unit 14, which may be called "relay box" is connected to an upper device 16, such as a personal computer. The receiver unit 14 converts key data, contained in the transmission data, into key codes to be processed by the upper device 16. The transmission data are transmitted from the wireless keyboard 12 according to wireless interface I/F. The receiver unit 14 supplies the key codes to the upper device 16, in accordance with predetermined keyboard interface KB-I/F. The upper device 16 is connected to a display 18 and an output device 15, such as a printer. The transmission data are hereinafter called "wireless data".

Figure 2:
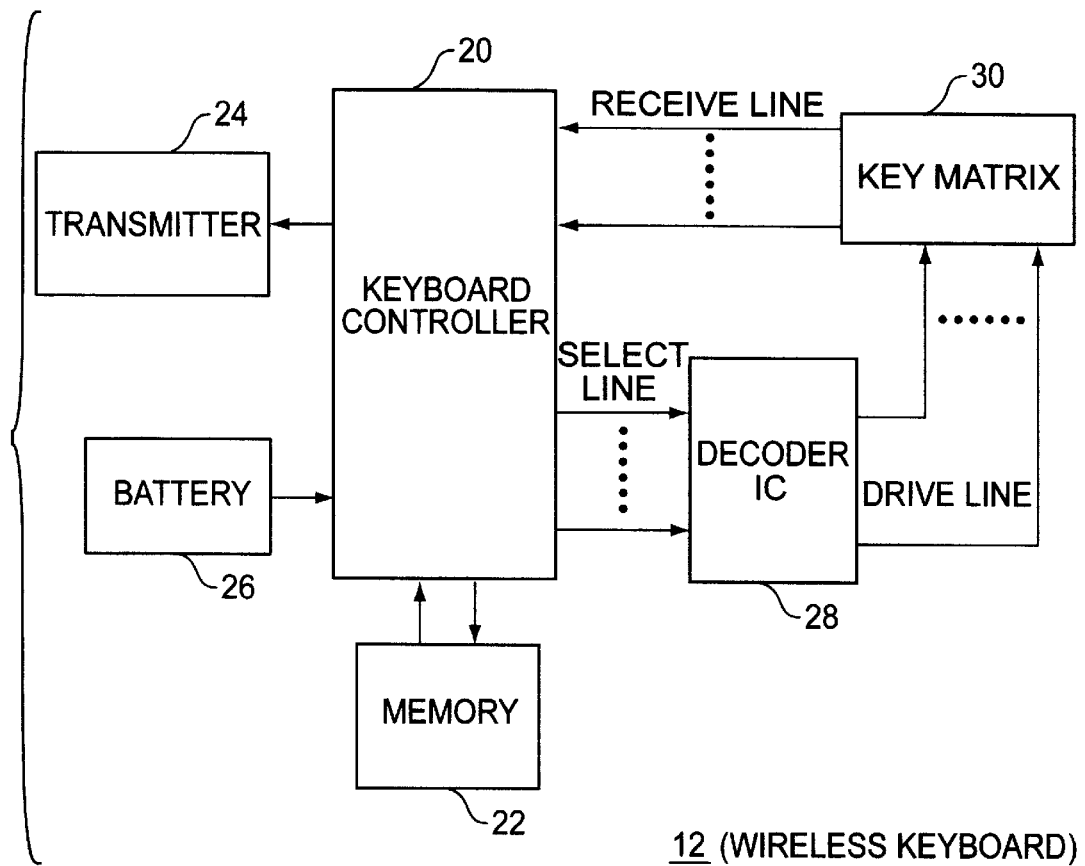
FIG. 2 is a block diagram showing a wireless keyboard used in the wireless keyboard system, shown in FIG. 1.

FIG. 2 shows the structure of the wireless keyboard 12, which includes a keyboard controller 20 which controls key scan operation and key data generating operation. The keyboard controller 20 is provided with a memory 22, which stores a status information of the nontext keys, which represents whether the nontext key has been pressed of released. The memory 22 may be contained in the keyboard controller 20. In general, a micro-controller is composed of the keyboard controller 20 and the memory 22. The wireless keyboard 12 further includes a transmitter 24, which transmits wireless data to the receiver unit 14, a battery 26, a key matrix 30 composed of a plurality of key switches, and a decoder IC 28.

Figure 3:
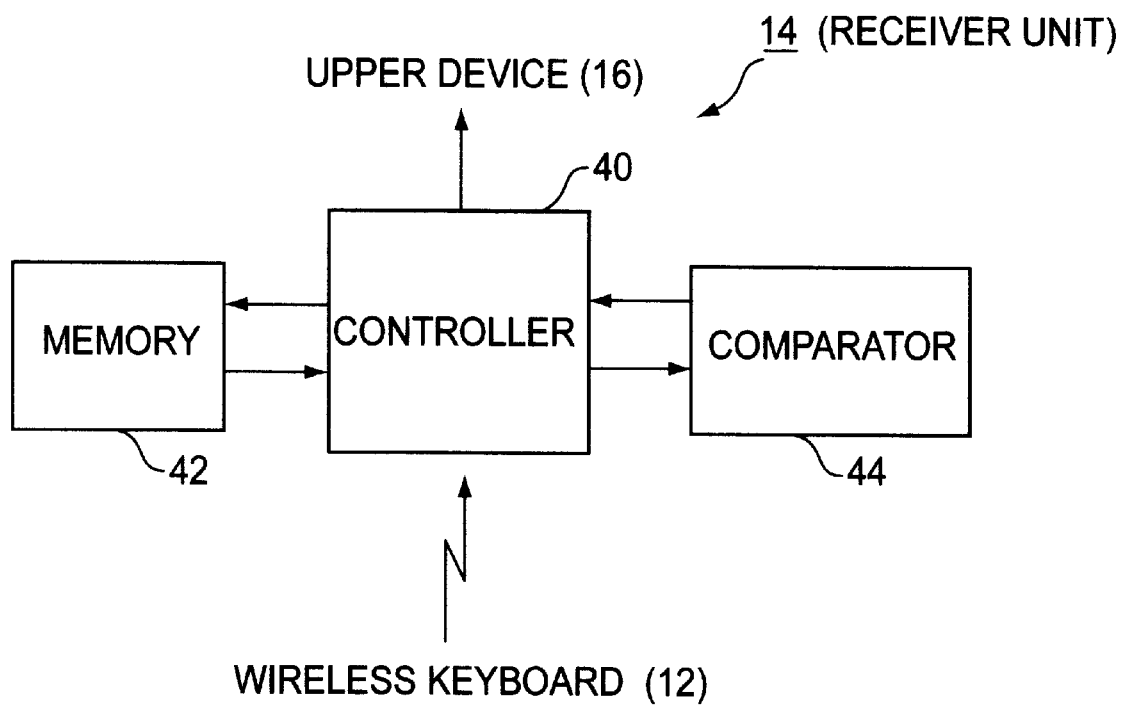
FIG. 3 is a block diagram showing a receiver unit used in the wireless keyboard system, shown in FIG. 1.

FIG. 3 shows the structure of the receiver unit 14, which includes a controller 40, a memory 42 and a comparator 44. The memory 42 stores a status information of the nontext keys, which represents whether the nontext key has been pressed of released in the wireless keyboard 12. The comparator 44 compares the status information stored in the memory 42 with the status information transmitted from the wireless keyboard 12. The controller 40 generates key codes corresponding to wireless data, transmitted from the wireless keyboard 12, referring to the output of the comparator 44.

Figure 4:
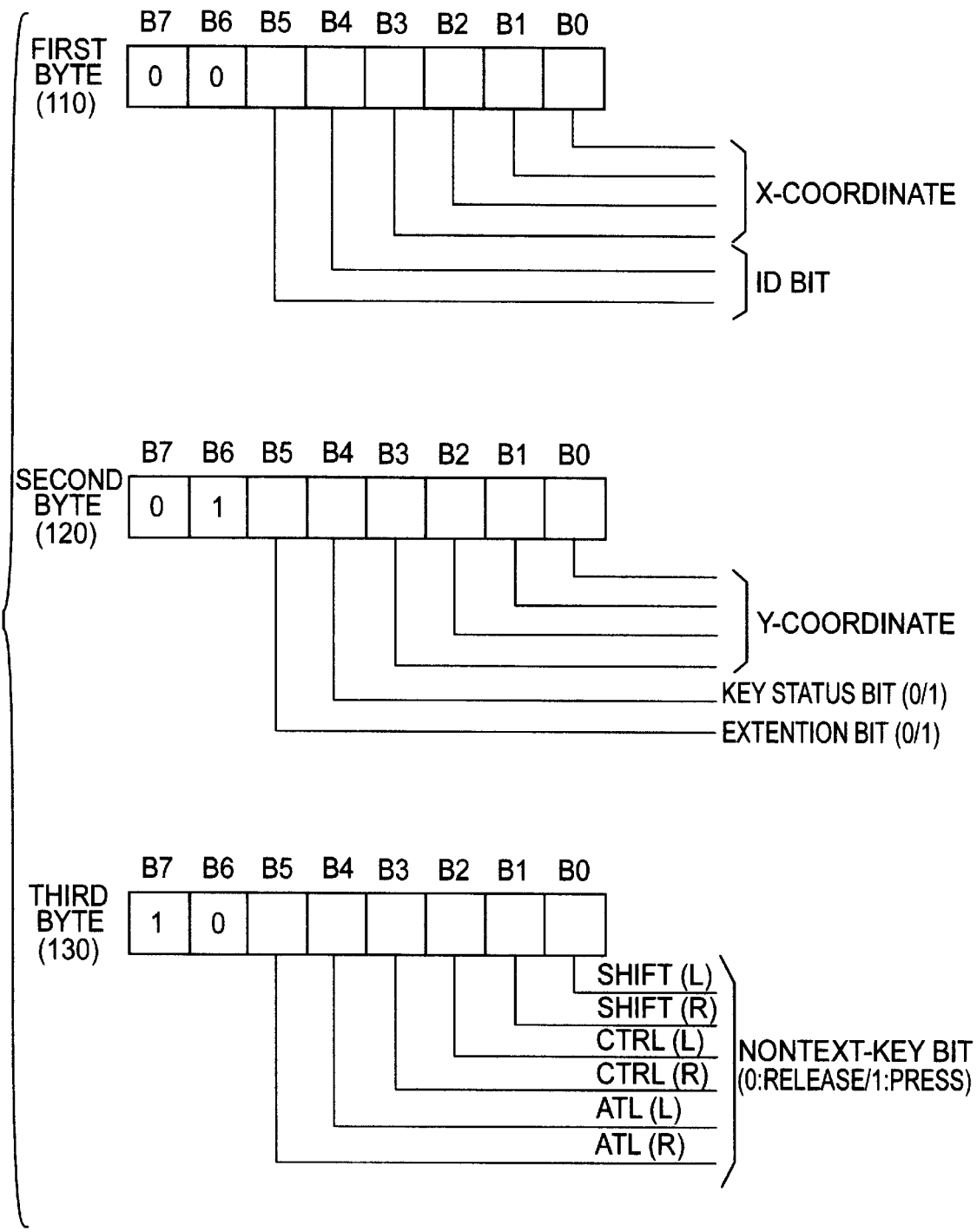
FIG. 4 is an explanatory diagram showing the structure of transmission data, transmitted from the wireless keyboard, shown in FIG. 2.

FIG. 4 shows the data structure of the wireless data, transmitted from the wireless keyboard 12 to the receiver unit 14. The wireless data includes KB-ID Keyboard ID) bits, key data and decision bits. The decision bits represent whether the key data is for a pressed key or released key. As shown in FIG. 4, first to third bytes 110, 120 and 130 can be transmitted as the wireless data to the receiver unit 14. If no nontext key is pressed, only the first and second bytes 110 and 120 are transmitted as the wireless data. If any of the nontext keys are pressed, all the first to third bytes 110, 120 and 130 are transmitted. In each byte, the first two bits B7 and B6 are identification bits indicating which byte it is. In the first to third bytes 110, 120 and 130, the first two bits B7 and B6 hold values of "00," "01" and "10," respectively.

In the first byte 110, bits B5 and B4 are ID bits indicating the wireless keyboard 12 itself. The ID bits distinguish the wireless keyboard 12 from other wireless keyboards located around there. In this case, four wireless keyboards can be distinguished from each other, because two bits are assigned to the ID bits B5 and B4. Those four different wireless keyboards are indicated by "00," "01," "10" and "11". The last four bits B3 to B0 represent the X-coordinate of the pressed key in the key matrix 30 (shown in FIG. 2).

In the second byte 120, bit B5 represents whether or not the third byte 130 is to be transmitted, namely whether or not any nontext keys have been pressed. If the third byte 130 is necessary, the bite B5 holds "1". A bit B4 represents whether the key is pressed or released by holding "1" and "0," respectively. The last four bits B3 to B0 represent the X-coordinate of the pressed key in the key matrix 30.

For example, when the first and second bytes 110 and 120 hold "00010110" and "01011100," respectively, key data at the location of X-coordinate "0110" and Y-coordinate "1100" is pressed, and the key data are transmitted from the keyboard of KB-ID "01" without the third byte 130.

In the third byte 130, six bits B5 to B0 represent whether the corresponding nontext keys are pressed or released. The bits B5 to B0 hold binary data for nontext keys ALT(R), ALT(L), CTRL(R), CTRL(L), SHIFT(R) and SHIFT(L), respectively. Each of the bits B5 to B0 holds values "1" and "0" when the corresponding key is being pressed and released, respectively.

Figure 5:
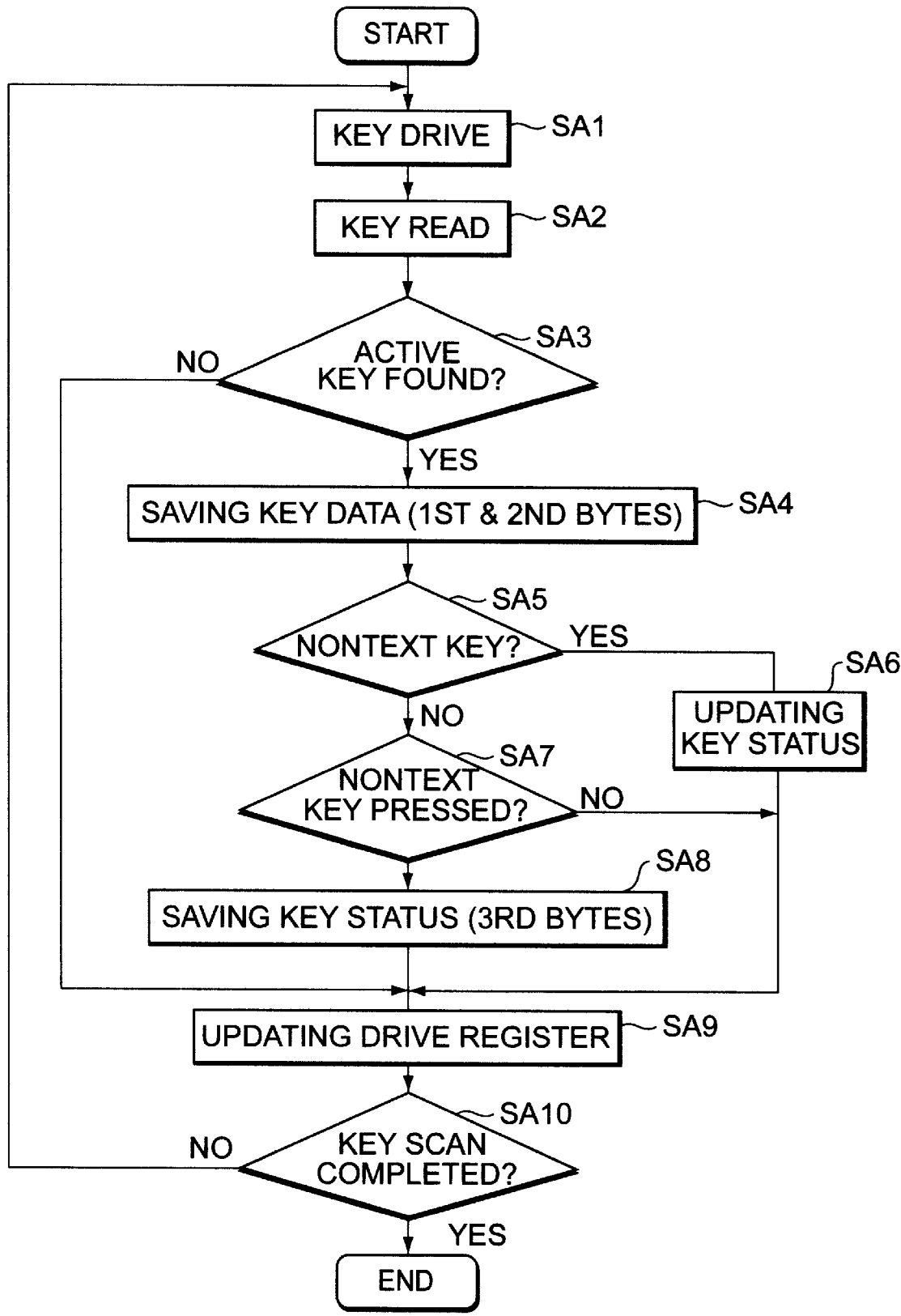
FIG. 5 is a flow chart showing the operation of the wireless keyboard, shown in FIG. 2.

FIG. 5 is a flow chart showing the operation of the keyboard controller 20 in the wireless key board 12. In step SA1, the keyboard controller 20 drives a drive line, which is the output of the decoder IC 28, using a select line. In step SA2, the keyboard controller 20 reads data of the key matrix 30 through a receive line. In step SA3, the keyboard controller 20 decides whether or not any active keys exist. If an active key exists, the first and second bytes 110 and 120 (shown in FIG. 4) are generated as wireless data, which represents whether the active key is pressed or released. In step SA4, the wireless data are saved (up) in a transmission buffer located in the memory 22.

In step SA5, the keyboard controller 20 decides whether or not the active key is one of the nontext keys. If the active key is one of the nontext keys, the keyboard controller 20 stores status information of the nontext key in the memory 22, in step SA6. The status information represents whether the nontext key is pressed or released. The operation of the step SA6 may be called "update of the status information." The status information is designed to correspond to the third byte 130, shown in FIG. 4. For example, the status information in the memory 22 may be represented by eight bits of "xx000000." The last six bits of the status information correspond to the last six bits of the third byte 130. Namely, when the nontext key is pressed and released, the corresponding bit becomes 1 and 0 in the status information, respectively.

If the active key is none of the nontext keys, the keyboard controller 20 reads the status information from the memory 22 to decide whether the nontext key has been pressed or released, in step SA7. If the nontext key has been pressed, the keyboard controller 20 generates the third byte 130 to tell the receiver unit 14 the nontext key has been pressed. In step SA8, the third byte 130 (status information) is stored in the transmission buffer.

After that, the keyboard controller 20 updates registers for the drive line and the others, in step SA9. In step SA10, the keyboard controller 20 decides whether or not the key scanning operation has been completed. If the key scan has not been completed, the step SA1 is repeated. If the key scan has already been completed, the keyboard controller 20 performs the next processing. For transmission of wireless data, the data stored in the transmission buffer are transmitted in the order of saving at a predetermined interval.

Figure 6:
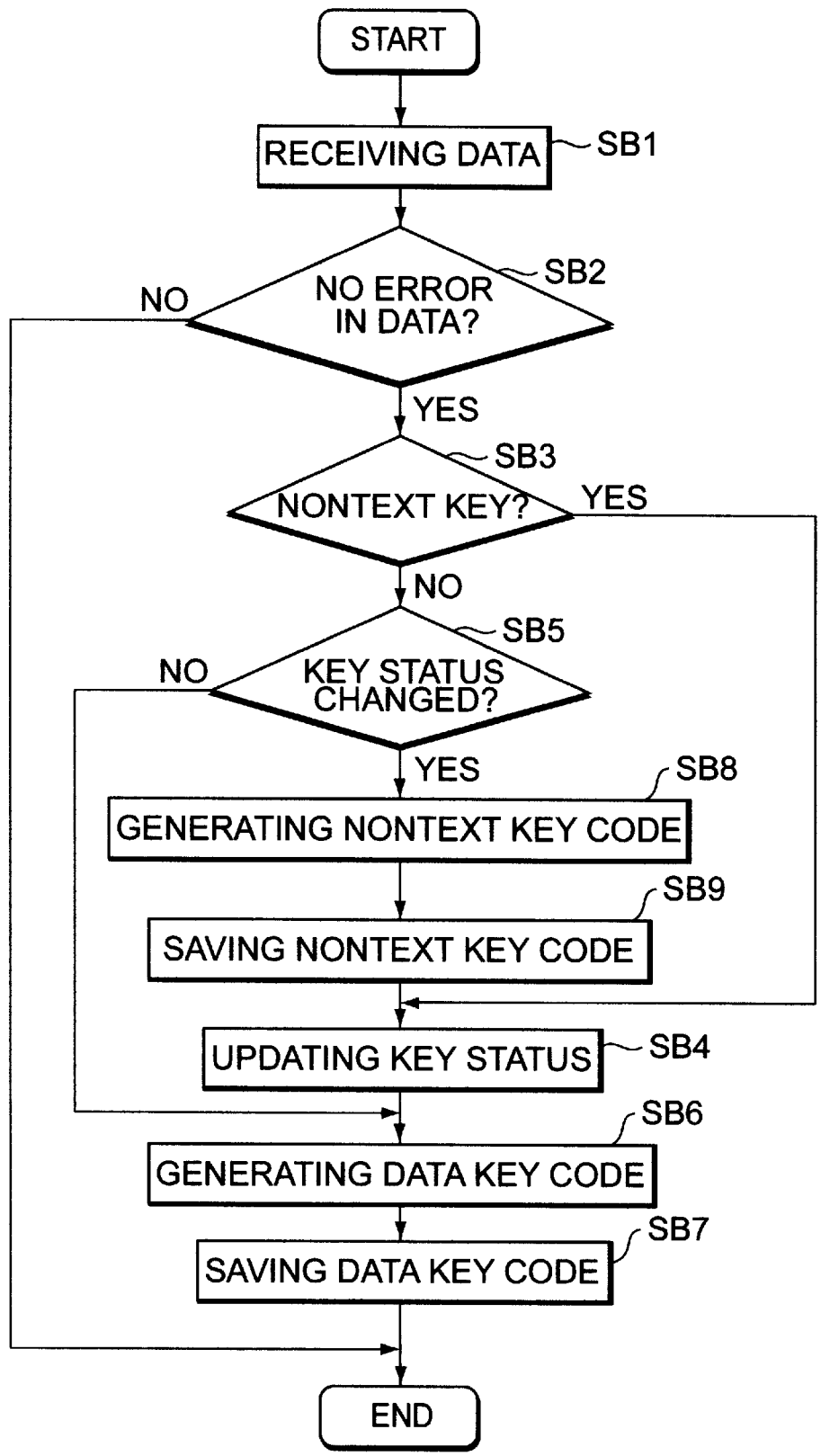
FIG. 6 is a flow chart showing the operation of the receiver unit, shown in FIG. 3.

FIG. 6 is a flow chart showing the operation of the receiver unit 14. When the wireless data from the wireless keyboard 12 (SB1) are received, the receiver unit 14 performs parity-check and other type of check to find errors in the wireless data (SB2). If no errors are found from the wireless data, the controller 40 decides whether the received wireless data is for the nontext key or not, in step SB3. If the received wireless data is for the nontext key, the controller 40 stores the status information of the nontext key in the memory 42 (SB4). The status information of the nontext key is hereinafter called "second status information." The operation of step SB4 may be called "update of second status information." The second status information is designed to correspond to the third byte 130, shown in FIG. 4, as well as the status information stored in the memory 22. For example, the status information, transmitted from the wireless keyboard 12, may be represented by eight bits of "xx000000." The last six bits of the status information correspond to the last six bits of the third byte 130. Namely, when the nontext key is pressed and released, the corresponding bit becomes 1 and 0 in the status information, respectively.

If the received wireless data are not for the nontext key, the comparator 44 compares the status information, stored in the memory 42, to the third byte 130 (status information) transmitted from the wireless keyboard 12. In other words, the controller 40 finds change (difference) of the status of the nontext key on the basis of the comparison result of the comparator 44 (SB5). If the status information in the memory 42 is identical to the status information transmitted from the wireless keyboard 12, the controller 40 generates a key code for wireless data in accordance with the keyboard interface KB-I/F (SB6). The controller 40 saves the key code in a key-code transmission buffer (not shown) located in the memory 42 (SB7).

If the status information, stored in the memory 42, is different from the status information, transmitted from the wireless keyboard 12, the controller 40 generates the key code of the nontext key on the basis of the third byte 130 (SB8). The controller 40 saves the key code in the key code transmission buffer (SB9), and at the same time, updates the memory 42 (SB4). The controller 40 transfers the key codes from the key code transmission buffer to the upper device 16 in the order of saving.

Figure 7:
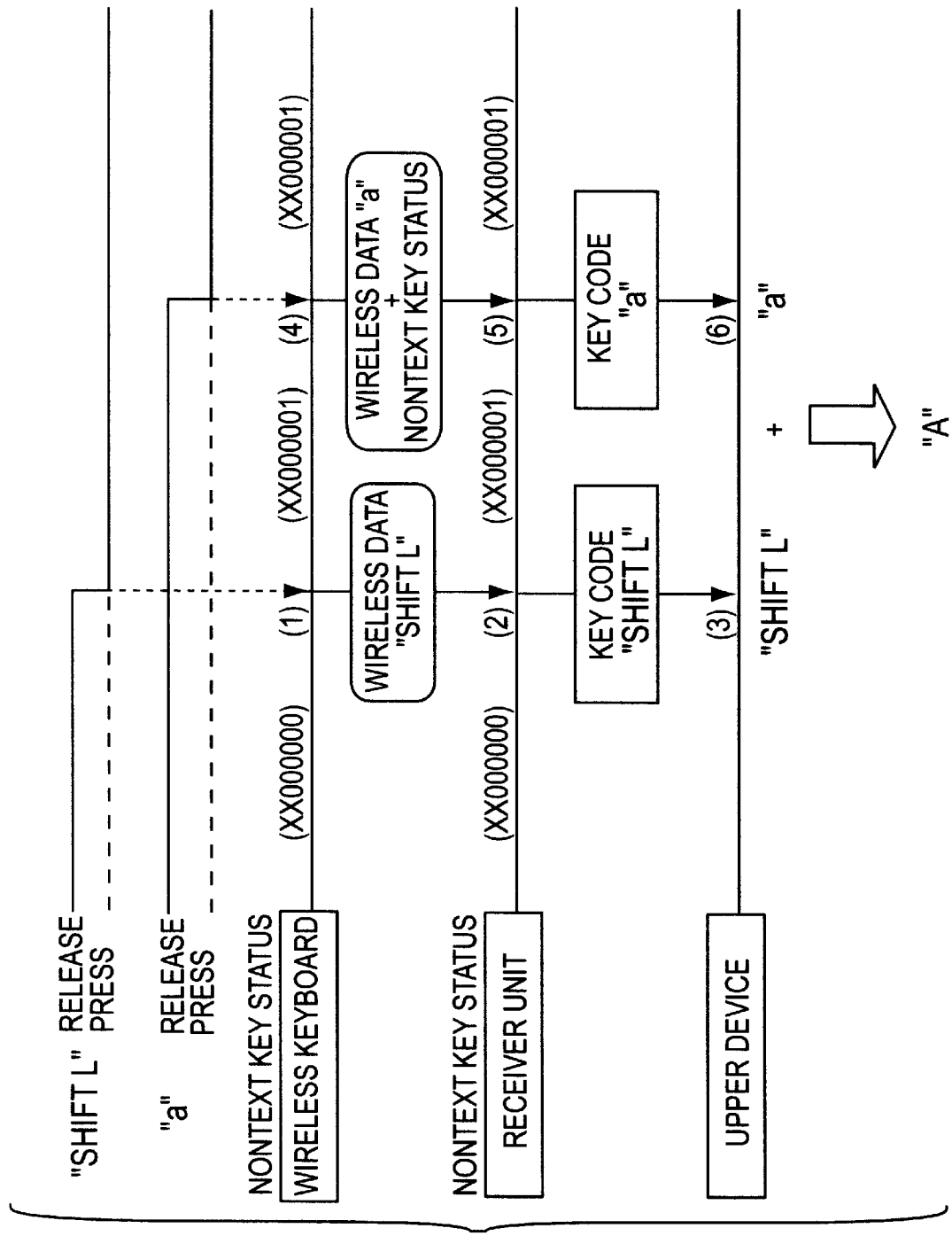
FIG. 7 is a timing chart showing the operation of the wireless keyboard system in normal case.

Next, operation for processing nontext key "SHIFT(D)" and standard key "a," which are pressed simultaneously, is described. FIG. 7 is a timing chart showing the operation, in which key data of "SHIFT(L)" and "a" are transmitted normally from the wireless keyboard 12 to the receiver unit 14. When the nontext key "SHIFT(L)" is pressed, the keyboard controller 20 performs the operation shown in FIG. 5 to update the status information "xx000000" stored in the memory 22 to "xx000001," at timing (1). At the same time, the keyboard controller 20 generates the key data of the nontext key "SHIFT(L)," composed of the first and second bytes 110 and 120, shown in FIG. 4. The key data of the nontext key "SHIFT(L)" are transmitted from the transmitter 24 to the receiver unit 14.

When the wireless data (key data) of "SHIFT(L)" is received, the receiver unit 14 performs the operation shown in FIG. 6 to update the status information "xx000000," stored in the memory 42, to "xx000001," at timing (2). At the same time, the controller 40 generates a key code of the nontext key "SHIFT(L)" on the basis of the first and second bytes 110 and 120. The key code is supplied to the upper device 16, at timing (3).

Subsequently, when the standard key "a" is pressed, the keyboard controller 20 performs the operation of FIG. 5. In processing for generating wireless data of "a," the second byte 120 have the bit B5 hold value 1, and the third byte 130 is generated, at timing (4), because the nontext key "SHIFT (L)" is being pressed. The third byte 130, which is the status information, is transmitted together with the first and second bytes 110 and 120 to the receiver unit 14.

When the wireless data, composed of the three bytes 110, 120 and 130, are received, the receiver unit 14 performs the operation of FIG. 6. The controller 40 finds that the received wireless data are for none of the nontext keys, and makes the comparator 44 compare the bits B5 to B0 of the third byte 130 with the status information "xx000001," stored in the memory 42, at timing (5). In this case, the status information in the memory 42 is identical to the status information transmitted from the wireless keyboard 12, because the key data (wireless data) of the nontext key "SHIFT(L)" have been received. The status information transmitted from the wireless keyboard corresponds to the bits B5 to B0 in the third byte 130. In other words, there is no change between the status information in the memory 42 and the status information transmitted from the wireless keyboard 12. The controller 40 only generates a key code of the standard key "a," and supplies the key code to the upper device 16, at timing (6). Consequently, the upper device 16 recognize a key "A" from the simultaneously pressed keys "SHIFT(L)" and "a."

Figure 8:
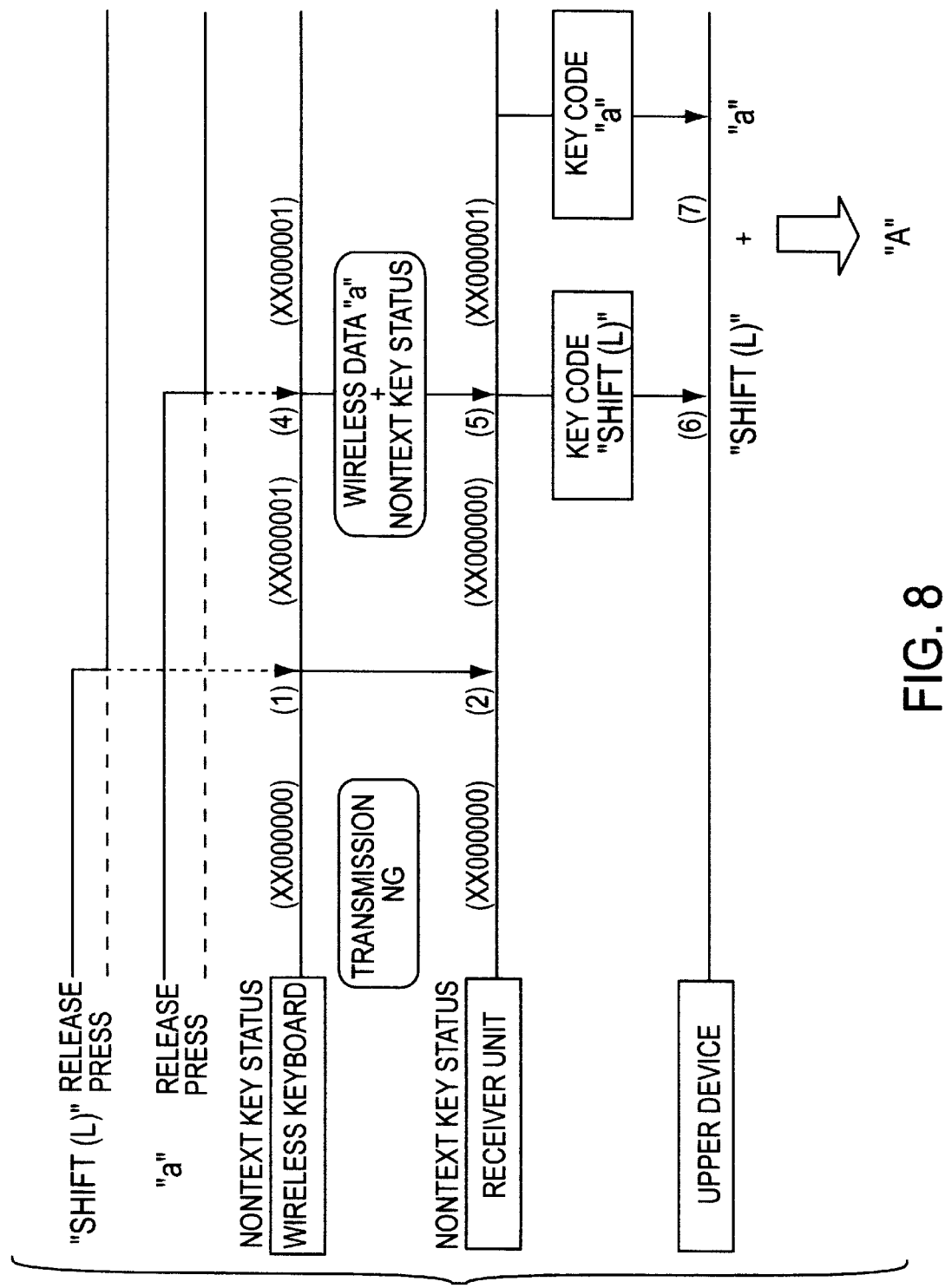
FIG. 8 is a timing chart showing the operation of the wireless keyboard system in the case where a transmission error happens.

FIG. 8 is a timing chart showing the operation, in which key data of "SHIFT(L)" are not transmitted normally from the wireless keyboard 12 to the receiver unit 14. When the nontext key "SHIFT(L)" is pressed, the keyboard controller 20 performs the operation shown in FIG. 5 to update the status information "xx000000" stored in the memory 22 to "xx000001," at timing (1). However, the status information stored in the memory 42 maintains "xx000000," at timing (2), because no key data of the nontext key "SHIFT(L)" are transmitted to the receiver unit 14.

Subsequently, when the standard key "a" is pressed, the keyboard controller 20 performs the operation of FIG. 5. In processing for generating wireless data of "a," the second byte 120 have the bit B5 hold value 1, and the third byte 130 is generated, at timing (4), because the nontext key "SHIFT (L)" is being pressed. The third byte 130, which is the status information, is transmitted together with the first and second bytes 110 and 120 to the receiver unit 14.

When the wireless data, composed of the three bytes 110, 120 and 130, are received, the receiver unit 14 performs the operation of FIG. 6. The controller 40 finds that the received wireless data are for none of the nontext keys, and makes the comparator 44 compare the bits B5 to B0 of the third byte 130 with the status information "xx000000," stored in the memory 42, at timing (5). In this case, the status information in the memory 42 is different from the status information transmitted from the wireless keyboard 12, because the key data (wireless data) of the nontext key "SHIFT(L)" have not been received. The status information transmitted from the wireless keyboard 12 corresponds to the bits B5 to B0 in the third byte 130. In other words, there is a change between the status information stored in the memory 42 and the status information transmitted from the wireless keyboard 12. The controller 40 generates a key code of the nontext key "SHIFT(L)" on the basis of the contents of the third byte 130, which is corresponding to the status information transmitted from the wireless keyboard 12. The controller 40 updates the status information "xx000000," stored in the memory 42, to "xx000001." Then, the controller 40 successively supplies the key codes of "SHIFT(L)" and "a" to the upper device 16, at timing (6) and (7). Consequently, the upper device 16 recognize a key "A" from the simultaneously pressed keys "SHIFT(L)" and "a," although key data of the nontext key "SHIFT(L)" have not transmitted to the receiver unit 14.

As mentioned above, according to the embodiment, the wireless keyboard 12 and the receiver unit 14 are provided with the memories 22 and 42, each storing the status information of the nontext keys. Therefore, the status of the nontext keys can be found anytime. The status information stored in the memory 22 is updated when the nontext key is pressed, and the status information stored in the memory 42 is updated when the key data of the nontext key is received. Therefore, both the status informations in the memories 22 and 42 is always updated to the real value.

The status information (the third byte 130), stored in the memory 22, is transmitted together with key data of the simultaneously-pressed standard key to the receiver unit 14. Thus, the receiver unit 14 can know the existence of the nontext key even though the key data (wireless data) of the nontext key are not normally received. In the receiver unit 14, the status information, stored in the memory 42, is compared with the status information, transmitted from the wireless keyboard 12. The controller 40 generates the key code of the nontext key, if the status information in the memory 42 is different from the status information from the wireless keyboard 12, so that the upper device 16 can accurately recognize which keys have been pressed at the wireless keyboard 12.

In the above-described embodiment, key data of the nontext key are transmitted when the nontext key is pressed, then the status information is transmitted together with key data of the simultaneously-pressed standard key. There is another system, in which no key data of the nontext keys are always transmitted to the receiver unit 14.

Figure 9:
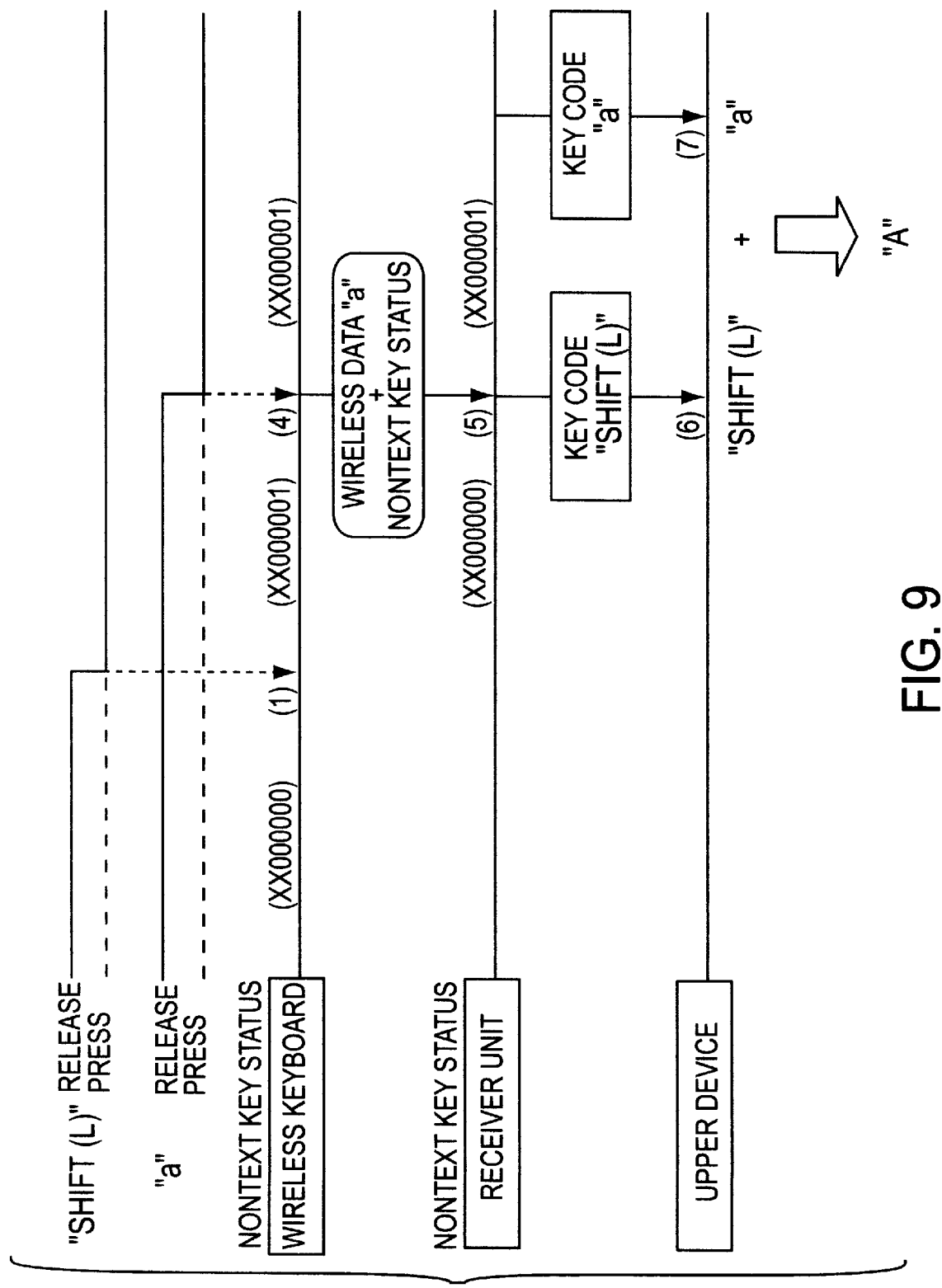
FIG. 9 is a timing chart showing the operation of the wireless keyboard system, according to a second preferred embodiment of the invention.

FIG. 9 is a timing chart showing the operation of a wireless keyboard system, according to a second preferred embodiment of the invention. The embodiment employs the same hardware as the first preferred embodiment, so the same description is not repeated for avoiding redundant description. In other words, the difference between the first and second embodiments is just transmission technique of wireless data. In this embodiment, no key data of the nontext keys are transmitted to the receiver unit 14 even if the nontext key is pressed, but the status information thereof is transmitted together with key data of the simultaneously-pressed standard key.

When the nontext key "SHIFT(L)" is pressed, the keyboard controller 20 updates the status information "xx000000" stored in the memory 22 to "xx000001," at timing (1). The keyboard controller 20 does not generate key data of the nontext key "SHIFT(L)," and the status information in the memory 42 maintains "xx000000." Subsequently, when the standard key "a" is pressed, at timing (4), the keyboard controller 20 generates wireless data of "a," using the first and second bytes 110 and 120. In this case, the second byte 120 have the bit B5 hold value 1, and the third byte 130 is generated, because the nontext key "SHIFT(L)" is being pressed. The third byte 130, which is the status information, is transmitted together with the first and second bytes 110 and 120 to the receiver unit 14.

When the wireless data are received by the receiver unit 14, the comparator 44 compares the bits B5 to B0 of the third byte 130 with the status information "xx000000," stored in the memory 42, at timing (5). In this case, the status information in the memory 42 is different from the status information transmitted from the wireless keyboard 12, because the key data (wireless data) of the nontext key "SHIFT(L)" have not been received. The status information transmitted from the wireless keyboard 12 corresponds to the bits B5 to B0 in the third byte 130. In other words, there is a change between the status information in the memory 42 and the status information transmitted from the wireless keyboard 12. The controller 40 generates a key code of the nontext key "SHIFT(L)" on the basis of the contents of the third byte 130, which is corresponding to the status information transmitted from the wireless keyboard 12. The controller 40 updates the status information "xx000000," stored in the memory 42, to "xx000001." Then, the controller 40 successively supplies the key codes of "SHIFT(L)" and "a" to the upper device 16, at timing (6) and (7). Consequently, the upper device 16 recognize a key "A" from the simultaneously-pressed keys "SHIFT(L)" and "a," although key data of the nontext key "SHIFT(L)" have not transmitted to the receiver unit 14.

Figure 10:
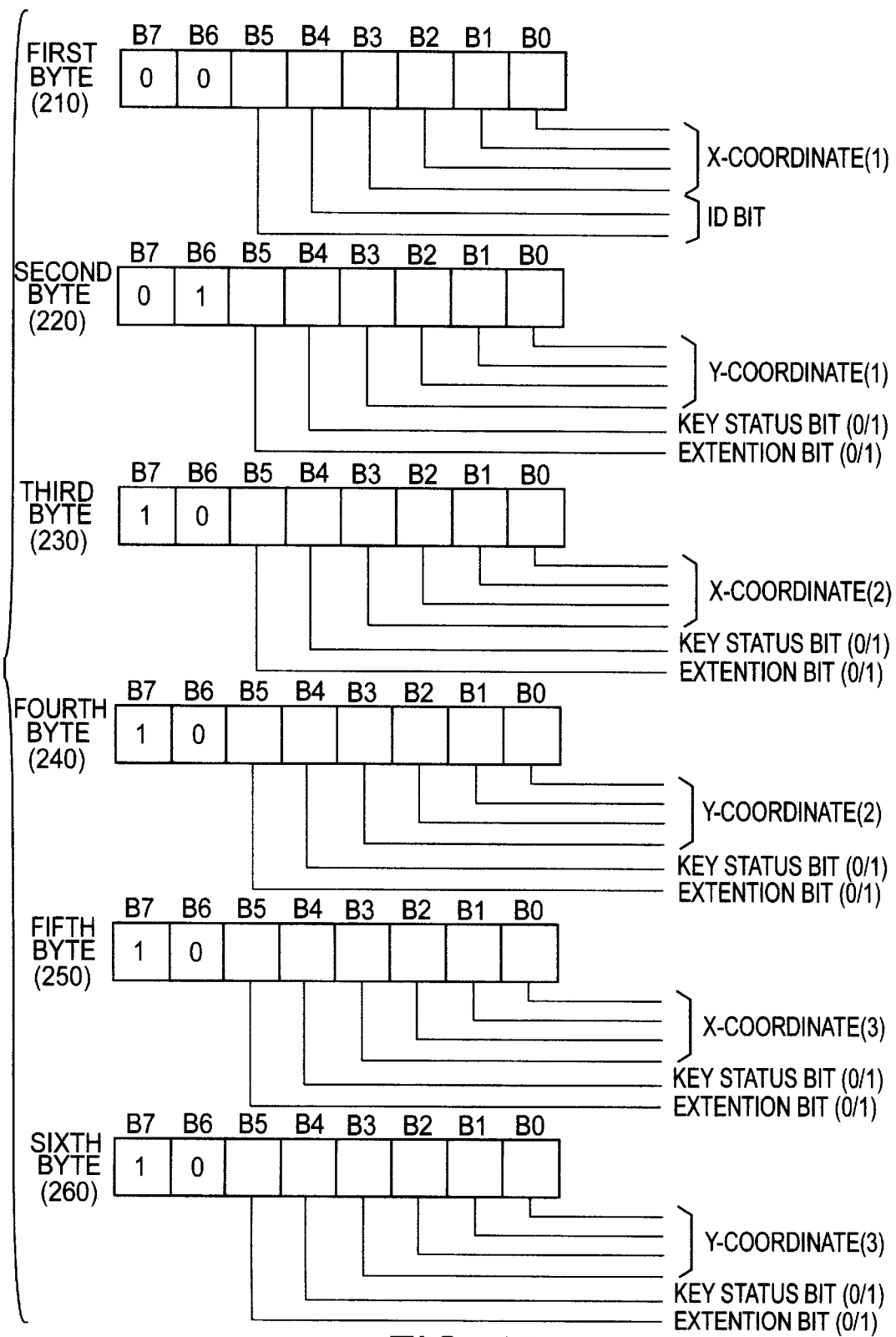
FIG. 10 is an explanatory diagram showing the structure of transmission data, according to a third preferred embodiment of the invention.

FIG. 10 shows the data structure of wireless data transmitted from the wireless keyboard 12, according to a third preferred embodiment of the invention. The embodiment employs the same hardware as the first preferred embodiment, so the same description is not repeated for avoiding redundant description. In other words, the difference between the first and third embodiments is just the data structure of the wireless data. In this embodiment, when one nontext key is pressed together with one standard key, key data of both keys are transmitted as wireless data at the same time. In other words, first and second bytes 210 and 220 are transmitted when only one key is pressed. When one nontext key is pressed together with one standard key, first to fourth bytes 210, 220, 230 and 240 are transmitted all together. When two nontext keys are pressed together with one standard key, first to sixth bytes 210, 220, 230, 240, 250 and 260 are transmitted all together.

In each byte, bits B7 and B6 are byte-ID bits representing which byte it is. For example, "00xxxxxx," "01xxxxxx" and "10xxxxxx" represent the first, second and third bytes 210, 220 and 230, respectively. In the first byte 210, bits B5 and B4 are keyboard-ID bits representing which keyboard it is, and bits B3 to B0 represent the x-coordinate of the pressed key on the key matrix 30.

In the second byte 220, bit B5 represents whether or not any extension data follow. When any extension data follow the second byte 220, the bit B5 holds value 1. When no extension data follow the second byte 220, the bit B5 holds value 0. A bit B4 represent whether the key is pressed or released, in which the bit B4 holds values 1 and 0 when the key is pressed and released, respectively. Bits B3 to B0 represent the x-coordinate of the pressed key on the key matrix 30.

The third to six bytes 230, 240, 250 and 260 are sent for extension data which are used only when any nontext keys are pressed with the standard keys. In each of the third and fourth bytes 230 and 240, a bit B5 represents whether or not any extension data (250 and 260) exist. In each of the third to six bytes 230, 240, 250 and 260, a bit B4 represents which key it is. When the key is a nontext key, the bit B4 holds value 1. When the key is a standard key, the bit B4 holds value 0. In each of the third and fifth bytes 230 and 250, bits B3 to B0 represent the x-coordinate of the corresponding key on the key matrix 30. In each of the fourth and sixth bytes 240 and 260, bits B3 to B0 represent the y-coordinate of the corresponding key on the key matrix 30.

In operation, when nontext key "SHIFT(L)" and standard key "a" are pressed simultaneously (in parallel), the key press data are generated from the first to fourth bytes 210, 220, 230 and 240. The first and second bytes 210 and 220 hold the x-coordinate and y-coordinate of "SHIFT(D)," and the third and fourth bytes 230 and 240 hold the x-coordinate and y-coordinate of "a". The operation of transmitting such data can be performed in the manner shown in FIGS. 5 and 6.

Now, the operation for transmitting wireless data in the case where the nontext key "SHIFT(L)" and the standard key "a" are pressed together is described. When the nontext key "SHIFT(L)" is pressed, the keyboard controller 20 updates the status information stored in the memory 22, in accordance with the steps SA1 to SA6 in FIG. 5. In this embodiment, the status information is composed of two bytes, while that is composed of one byte in the above described other embodiments. Therefore, the step SB5 in FIG. 6 can be performed easily.

It is assumed that no wireless data (key data) of the nontext key "SHIFT(L)" is transmitted to the receiver unit 14. The status information in the memory 42 maintains "xx000000," which represents that the nontext key "SHIFT (L)" has not been pressed. Subsequently, when the standard key "a" is pressed, the keyboard controller 20 generates both wireless data of "a" and "SHIFT(L)" using the first to fourth bytes 210, 220, 230 and 240. The first and second bytes 210 and 220 represent that the nontext key "SHIFT(L)" has been pressed. The third and fourth bytes 230 and 240 represent that the standard key "a" is pressed. The first to fourth bytes 210, 220, 230 and 240 are transmitted to the receiver unit 14 all together.

When the wireless data are received by the receiver unit 14, the comparator 44 compares the status information, stored in the memory 42, with the status information composed of the first and second bytes 210 and 220, transmitted from the wireless keyboard 12. In this case, the status information in the memory 42 is different from the status information transmitted from the wireless keyboard 12, because the key data (wireless data) of the nontext key "SHIFT(L)" have not been received. In other words, there is a change between the status information in the memory 42 and the status information transmitted from the wireless keyboard 12. The controller 40 generates a key code of the nontext key "SHIFT(L)" on the basis of the contents of the first and second bytes 210 and 220, which are corresponding to the status information transmitted from the wireless keyboard 12. The controller 40 updates the status information, stored in the memory 42. Then, the controller 40 successively supplies the key codes of "SHIFT(L)" and "a" to the upper device 16. Consequently, the upper device 16 recognize a key "A" from the simultaneously pressed keys "SHIFT(L)" and "a," although key data of the nontext key "SHIFT(L)" have not transmitted to the receiver unit 14.

According to the third preferred embodiment, the key data of the standard key and the key data of the nontext key are combined to obtain the wireless data to be transmitted. Namely, the two pieces of the key data are transmitted together. As a result, the upper device 16 can always recognize the correct key information. In addition, the number of pieces of data is not limited, so that more extension of data transmission can be realized easily. In other words, flexibility of key data transmission is improved.

Although the invention has been described with respect to the specific embodiments for complete and clear disclosure, the appended claims are not be thus limited but are to be construed as embodying all modification and alternative constructions that may occur to one skilled in the art which fairly fall within the basic teaching herein set forth.

What is claimed is:

1. A wireless keyboard system, comprising:

a wireless keyboard which comprises standard keys, each of which functions itself, nontext keys which only function together with a simultaneously-pressed standard key, a controller for detecting the status of the standard key and the nontext key and generating a status information representing whether the nontext key is pressed or released and a key data representing which standard key is pressed and which nontext key is pressed, and a transmitter which transmits the key data together with the status information; and a receiver unit which receives the key data transmitted together with the status information from the wireless keyboard and generates a key code on the basis of the key data with reference to the status information.

2. The wireless keyboard system, according to claim 1, wherein, the wireless keyboard further comprises a first memory which stores the status information, and the receiver unit comprises a second memory which stores the status information transmitted from the wireless keyboard.

3. The wireless keyboard system, according to claim 2, wherein, the status information, stored in the first memory, is updated when the nontext key is pressed, and the status information, stored in the second memory, is updated when the status information is different from the status information transmitted from the wireless keyboard.

4. The wireless keyboard system, according to claim 3, wherein, the receiver unit further comprises a comparator which compares the status information in the second memory with the status information transmitted from the wireless keyboard; and the receiver unit generates the key code of the nontext key based on the key data of the nontext key, if the status information stored in the second memory is different from the status information transmitted from the wireless key board according to the comparison result of the comparator.

5. The wireless keyboard system, according to claim 4, wherein, the transmitter does not transmit the key data of the nontext key when the nontext key is pressed, and the receiver unit generates the key code of the nontext key based on the key data of the nontext key, if the status information stored in the second memory is different from the status information transmitted from the wireless keyboard according to the comparison result of the comparator.

6. The wireless keyboard system, according to claim 2, wherein, the receiver unit updates the second memory when the key data of the nontext key is received before the status information is received together with the key data and generates the key code of the nontext key based on the received key data.

7. A wireless keyboard which generates key data, representing which key is pressed, in response to keystrokes, comprising:

standard keys, each of which functions itself;

nontext keys only finctioning together with a simultaneously-pressed standard key;

a controller for detecting a status of the standard key and the nontext key and generating a status information representing whether the nontext key is pressed or released and a key data representing which standard key is pressed and which nontext key is pressed; and a transmitter which transmits the key data together with the status information.

8. The wireless keyboard, according to claim 7, further comprising:

a memory which stores the status information.

9. The wireless keyboard, according to claim 8, wherein, the status information, stored in the memory, is updated when the nontext key is pressed.

10. The wireless keyboard, according to claim 9, wherein, the transmitter transmits the status information together with the key data of the simultaneously-pressed standard key.

11. The wireless keyboard, according to claim 10, wherein, the transmitter transmits the key data of the nontext key when the nontext key is pressed.

12. The wireless keyboard, according to claim 11, wherein, the transmitter does not transmit the key data of the nontext key when the nontext key is pressed, the controller generates the key data of the standard key including the status information stored in the memory when the standard key is pressed.

13. A receiver unit which receives key data transmitted together with a status information from a wireless keyboard and generates a key code on the basis of the key data transmitted from the wireless keyboard with reference to the status information; wherein the wireless keyboard transmits the status information of nontext keys, which represents whether the nontext key is pressed or released, the nontext key only functioning together with a simultaneously-pressed standard key, comprising:

a memory which stores the status information transmitted from the wireless keyboard, wherein the status information, stored in the memory, is updated when the status information is different from the status information transmitted from the wireless keyboard.

14. The receiver unit, according to claim 13, further comprising:

a comparator which compares the status information in the memory with the status information transmitted from the wireless keyboard, wherein the key code of the nontext key is generated based on the key data of the nontext key, if the status information stored in the memory is different from the status information transmitted from the wireless keyboard, according to the comparison result of the comparator.

15. A method for processing a key data, transmitted from a wireless keyboard to a receiver unit, in which the wireless key board comprises standard keys each functioning itself and nontext keys functioning together with a simultaneously-pressed standard key, comprising the steps of:

detecting a status of the nontext key to generate a status information representing whether the nontext key is pressed or released;

generating a key data representing which standard key is pressed and which nontext key is pressed;

transmitting from the wireless keyboard the key data together with the status information to the receiver unit; and generating in the receiver unit a key code on the basis of the key data with reference to the status information.

16. The method, according to claim 15, further comprising the steps of:

storing in the wireless keyboard the status information; and storing in the receiver unit the status information transmitted from the wireless keyboard.

17. The method, according to claim 16, wherein, the status information is transmitted together with key data of the simultaneously-pressed standard key.

18. The method, according to claim 16, further comprising the step of:

transmitting from the wireless keyboard the key data of the nontext key when the nontext key is pressed.

19. The method, according to claim 17, further comprising the steps of:

transmitting no key data of the nontext key when the nontext key is pressed; and generating the key data of the standard key including the status information stored in the wireless keyboard when the standard key is pressed.

20. The method, according to claim 16, further comprising the steps of:

comparing the status information stored in the receiver unit with the status information transmitted from the wireless keyboard; and generating the key code of the nontext key based on the key data of the nontext key, if the status information stored in receiver unit is different from the status information transmitted from the wireless keyboard according to the comparison result.

\* \* \* \* \*